US011631196B2

(12) United States Patent
Landron et al.

(10) Patent No.: US 11,631,196 B2
(45) Date of Patent: Apr. 18, 2023

(54) SYSTEMS AND METHODS TO OPTIMIZE IMAGING SETTINGS FOR A MACHINE VISION JOB

(71) Applicant: ZEBRA TECHNOLOGIES CORPORATION, Lincolnshire, IL (US)

(72) Inventors: David D. Landron, Coram, NY (US); Christopher M. West, South Setauket, NY (US); James Matthew Witherspoon, Howell, MI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/945,498

(22) Filed: Jul. 31, 2020

(65) Prior Publication Data

US 2022/0036586 A1 Feb. 3, 2022

(51) Int. Cl.
*G06T 7/70* (2017.01)
*G06T 7/80* (2017.01)

(52) U.S. Cl.
CPC . *G06T 7/80* (2017.01); *G06T 7/70* (2017.01)

(58) Field of Classification Search
CPC . G06T 7/80; G06T 7/70; H04N 5/243; H04N 5/2353; H04N 5/238; H04N 5/2354; H04N 5/23212; H04N 5/23218; H04N 5/2352; H04N 5/23216
See application file for complete search history.

(56) References Cited

U.S. PATENT DOCUMENTS

| 11,087,105 | B1 | 8/2021 | Biasini et al. | |
|---|---|---|---|---|
| 2003/0007690 | A1* | 1/2003 | Rajagopal | G06F 17/15 382/209 |
| 2011/0043689 | A1* | 2/2011 | Cobb | H04N 5/147 348/E7.003 |
| 2015/0146037 | A1* | 5/2015 | Keelan | H04N 9/04515 348/223.1 |
| 2018/0077298 | A1* | 3/2018 | Matsunaga | G06T 5/00 |

(Continued)

FOREIGN PATENT DOCUMENTS

EP 3813353 A 4/2021

OTHER PUBLICATIONS

Combined Search and Examination Report for Great Britain Patent Application No. GB2110553.1 dated Jan. 21, 2022.

*Primary Examiner* — Syed Haider
(74) *Attorney, Agent, or Firm* — Yuri Astvatsaturov

(57) ABSTRACT

Methods and systems for optimizing one or more imaging settings for a machine vision job are disclosed herein. An example method includes detecting, by one or more processors, an initiation trigger that initiates the machine vision job. The example method further includes, responsive to detecting the initiation trigger, capturing, by an imaging device, a first image of a target object in accordance with a first configuration of the one or more imaging settings. The example method further includes, responsive to capturing the first image of the target object, automatically adjusting, by the one or more processors, the one or more imaging settings to a second configuration that includes at least one different imaging setting from the first configuration; and capturing, by the imaging device, a second image of the target object in accordance with the second configuration of the one or more imaging settings.

20 Claims, 7 Drawing Sheets

(56) References Cited

U.S. PATENT DOCUMENTS

| | | |
|---|---|---|
| 2018/0204315 A1 | 7/2018 | Plihal et al. |
| 2018/0247292 A1* | 8/2018 | Crooks ............ G06K 19/06028 |
| 2020/0014846 A1 | 1/2020 | Venetianer et al. |
| 2020/0351466 A1 | 11/2020 | Donsbach et al. |
| 2021/0144289 A1 | 5/2021 | Vdovychenko |
| 2021/0211575 A1 | 7/2021 | Grant et al. |

* cited by examiner

300 —

File  Edit  View  Image  Sensor  System  Window  Help

≡ View Devices

≡ Menu

⇩ BACKUP DEVICE  ⟲ UPDATE FIRMWARE  ⟲ RESTORE  🖶 PRINT          310 — [ADD DEVICE]

⇧ Get Started
⊞ Create a Job
314   306
◎ View Devices ⊙
302
▦ Libraries

☐  Name ◆  Model No. ◆  IP ◆          Serial No. ◆  Mfg. Date ◆  Firmware ◆  Status ◆

☐ ▦ FS40-C89  BC1123648  192.168.1.34  MXA5HH11  5/16/2019  Plugin Name  ●Online  DATA VIEW [SETUP]

Device
Number 1234
●Online

Lorem ipsum dolor sit
amet, consectetur
adipiscing elit, sed do
eiusmod tempor
incididunt ut labore et
dolore magna aliqua.
Ut enim ad minim
veniam, quis nostrud
exercitation ullamco
laboris nisi ut aliquip ex
ea commodo  312B
consequat.
[DATA VIEW] [SETUP]

OVERVIEW
FWVersion                        CAAES500-001-R00D0                                    312A
Description                      User Defined
Core Services Version            1.16.0.49
Device Management                1.16.0.49
Version
ChiCore Library                  1.12.0.53
Version LICENSE
DHCP Timeout(s)                  30
IP Address Fallback              192.168.0.100
UpTime                           24:53:12
Available License Keys           1D BARCODE, 2D
                                 BARCODE, OCR,
                                 BASIC MV
Sensor Type                      2MP Color COMMUNICATIONS
Available Connection             USB,                          308
Types                            Ethernet
Current Connection               USB
Types
Connection Port                  54321
HID Port                         20001
IP Mode (Static/DHCP)            Static STATUS
Lens Type                        Liquid Lens                   304
Illumination Type                4 BANK, RGB
External Illumination            Off
Available GPIOs                  8

☐ ▦ FS40-C89  BC1123648  192.168.1.34  MXA5HH11  5/16/2019  Plugin Name  ○Offline  DATA VIEW [SETUP]
☐ ▦ FS40-C89  BC1123648  192.168.1.34  MXA5HH11  5/16/2019  Plugin Name  ●Online  DATA VIEW [SETUP]

△ Tutorials
⚙ Setting

FIG. 3

SYSTEMS AND METHODS TO OPTIMIZE IMAGING SETTINGS FOR A MACHINE VISION JOB

BACKGROUND

Ever since the introduction of machine vision systems to industrial settings, developers have been attempting to reduce their corresponding cost and space requirements. These systems are capable of executing machine vision jobs to provide high fidelity image analysis at a cost of capturing images under finely tuned imaging settings (e.g., exposure length). However, these machine vision jobs also typically require machine vision systems to cycle through multiple sets of imaging settings to capture multiple images with, for example, different depths of field. As a result, multiple cameras and extra external lights are needed in many conventional circumstances to ensure that the machine vision system is capable of capturing a suitable image for each set of imaging settings to provide the expected image analysis.

Unfortunately, each additional piece of equipment can be very costly, may further complicate installations, and may delay the machine vision job. For example, an average external light can cost anywhere from several hundred to several thousands of dollars, and an average camera and reader combination can cost anywhere from thousands to tens of thousands of dollars. Each additional component will also need to be integrated to the machine vision system, which can readily cost twice their purchase price. Moreover, each additional component bought and installed in a machine vision system may occupy valuable physical space that can create unnecessary or dangerous congestion in an industrial setting. Further, as a conventional system executes a job, the imaging settings for the conventional system typically require adjustments to the additional components, resulting in significant delays to the conventional system completing the job.

Thus, there is a need for systems and methods to optimize image settings for a machine vision job that allow for fast and efficient real-time image setting adjustments for machine vision system during a machine vision job.

SUMMARY

In an embodiment, the present invention is a method for optimizing one or more imaging settings for a machine vision job. The method includes detecting, by one or more processors, an initiation trigger that initiates the machine vision job. The method further includes, responsive to detecting the initiation trigger, capturing, by an imaging device, a first image of a target object in accordance with a first configuration of the one or more imaging settings. The method further includes, responsive to capturing the first image of the target object, automatically adjusting, by the one or more processors, the one or more imaging settings to a second configuration that includes at least one different imaging setting from the first configuration. The method further includes capturing, by the imaging device, a second image of the target object in accordance with the second configuration of the one or more imaging settings.

In a variation of this embodiment, the one or more imaging settings include one or more of (i) an aperture size, (ii) an exposure length, (iii) an ISO value, (iv) a focus value, (v) a gain value, or (vi) an illumination control.

In another variation of this embodiment, the initiation trigger comprises the target object entering a field of view (FOV) of the imaging device.

In yet another variation of this embodiment, the imaging device includes a single camera.

In still another variation of this embodiment, the machine vision job includes one or more machine vision tools configured to perform one or more machine vision techniques on the first image and the second image. In a further variation of this embodiment, the method further comprises: performing, by the one or more processors, the one or more machine vision techniques on the first image and the second image in accordance with the one or more machine vision tools included in the machine vision job; and generating, by the one or more processors, a result signal representing a pass indication or a fail indication for the machine vision job. In another further variation of this embodiment, the one or more machine vision tools include at least one of (i) a barcode scanning tool, (ii) a pattern matching tool, (iii) an edge detection tool, (iv) a semantic segmentation tool, (v) an object detection tool, or (vi) an object tracking tool.

In yet another variation of this embodiment, the machine vision job includes a predetermined number of configurations of the one or more imaging settings. In a further variation of this embodiment, the method further comprises: (a) designating the second image as a current image; (b) responsive to capturing the current image of the target object, automatically adjusting the one or more imaging settings to a subsequent configuration that includes at least one different imaging setting from each prior configuration of the one or more imaging settings; (c) capturing, by the imaging device, a subsequent image of the target object in accordance with the subsequent configuration of the one or more imaging settings; (d) designating the subsequent image as the current image; and (e) iteratively performing steps (b)-(e) until each configuration of the predetermined number of configurations of the one or more imaging settings has been utilized to capture at least one image of the target object.

In another embodiment, the present invention is a computer system for optimizing one or more imaging settings for a machine vision job. The system may comprise an imaging device configured to capture a first image of a target object in accordance with a first configuration of the one or more imaging settings, and capture a second image of the target object in accordance with a second configuration of the one or more imaging settings. The system may further comprise one or more processors; and a non-transitory computer-readable memory coupled to the imaging device and the one or more processors. The memory may store instructions thereon that, when executed by the one or more processors, cause the one or more processors to: detect an initiation trigger that initiates the machine vision job, and responsive to capturing the first image of the target object, automatically adjusting the one or more imaging settings to the second configuration that includes at least one different imaging setting from the first configuration.

In a variation of this embodiment, the one or more imaging settings include one or more of (i) an aperture size, (ii) an exposure length, (iii) an ISO value, (iv) a focus value, (v) a gain value, or (vi) an illumination control.

In another variation of this embodiment, the initiation trigger comprises the target object entering a field of view (FOV) of the imaging device.

In yet another variation of this embodiment, the machine vision job includes one or more machine vision tools configured to perform one or more machine vision techniques on the first image and the second image. Further in this variation, the instructions, when executed by the one or more processors, further cause the one or more processors to: perform the one or more machine vision techniques on the first image and the second image in accordance with the one or more machine vision tools included in the machine vision job; and generate a result signal representing a pass indication or a fail indication for the machine vision job.

In still another variation of this embodiment, the machine vision job includes a predetermined number of configurations of the one or more imaging settings. Further in this variation, the instructions, when executed by the one or more processors, further cause the one or more processors to: (a) designate the second image as a current image; (b) responsive to capturing the current image of the target object, automatically adjust the one or more imaging settings to a subsequent configuration that includes at least one different imaging setting from each prior configuration of the one or more imaging settings; (c) capture, by the imaging device, a subsequent image of the target object in accordance with the subsequent configuration of the one or more imaging settings; (d) designate the subsequent image as the current image; and (e) iteratively perform steps (b)-(e) until each configuration of the predetermined number of configurations of the one or more imaging settings has been utilized to capture at least one image of the target object.

In yet another embodiment, the present invention is a tangible machine-readable medium comprising instructions for optimizing one or more imaging settings for a machine vision job. When executed, the instructions cause a machine to at least: detect an initiation trigger that initiates the machine vision job; responsive to detecting the initiation trigger, capture, by an imaging device, a first image of a target object in accordance with a first configuration of the one or more imaging settings; responsive to capturing the first image of the target object, automatically adjust the one or more imaging settings to a second configuration that includes at least one different imaging setting from the first configuration; and capture, by the imaging device, a second image of the target object in accordance with the second configuration of the one or more imaging settings.

In a variation of this embodiment, the machine vision job includes one or more machine vision tools configured to perform one or more machine vision techniques on the first image and the second image. Further in this variation, the instructions, when executed, further cause the machine to at least: perform the one or more machine vision techniques on the first image and the second image in accordance with the one or more machine vision tools included in the machine vision job; and generate a result signal representing a pass indication or a fail indication for the machine vision job.

In another variation of this embodiment, the machine vision job includes a predetermined number of configurations of the one or more imaging settings, and wherein the instructions, when executed, further cause the machine to at least: (a) designate the second image as a current image; (b) responsive to capturing the current image of the target object, automatically adjust the one or more imaging settings to a subsequent configuration that includes at least one different imaging setting from each prior configuration of the one or more imaging settings; (c) capture, by the imaging device, a subsequent image of the target object in accordance with the subsequent configuration of the one or more imaging settings; (d) designate the subsequent image as the current image; and (e) iteratively perform steps (b)-(e) until each configuration of the predetermined number of configurations of the one or more imaging settings has been utilized to capture at least one image of the target object.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 depicts an example application interface utilized to optimize one or more imaging settings for a machine vision job, in accordance with embodiments described herein.

Figure 1:
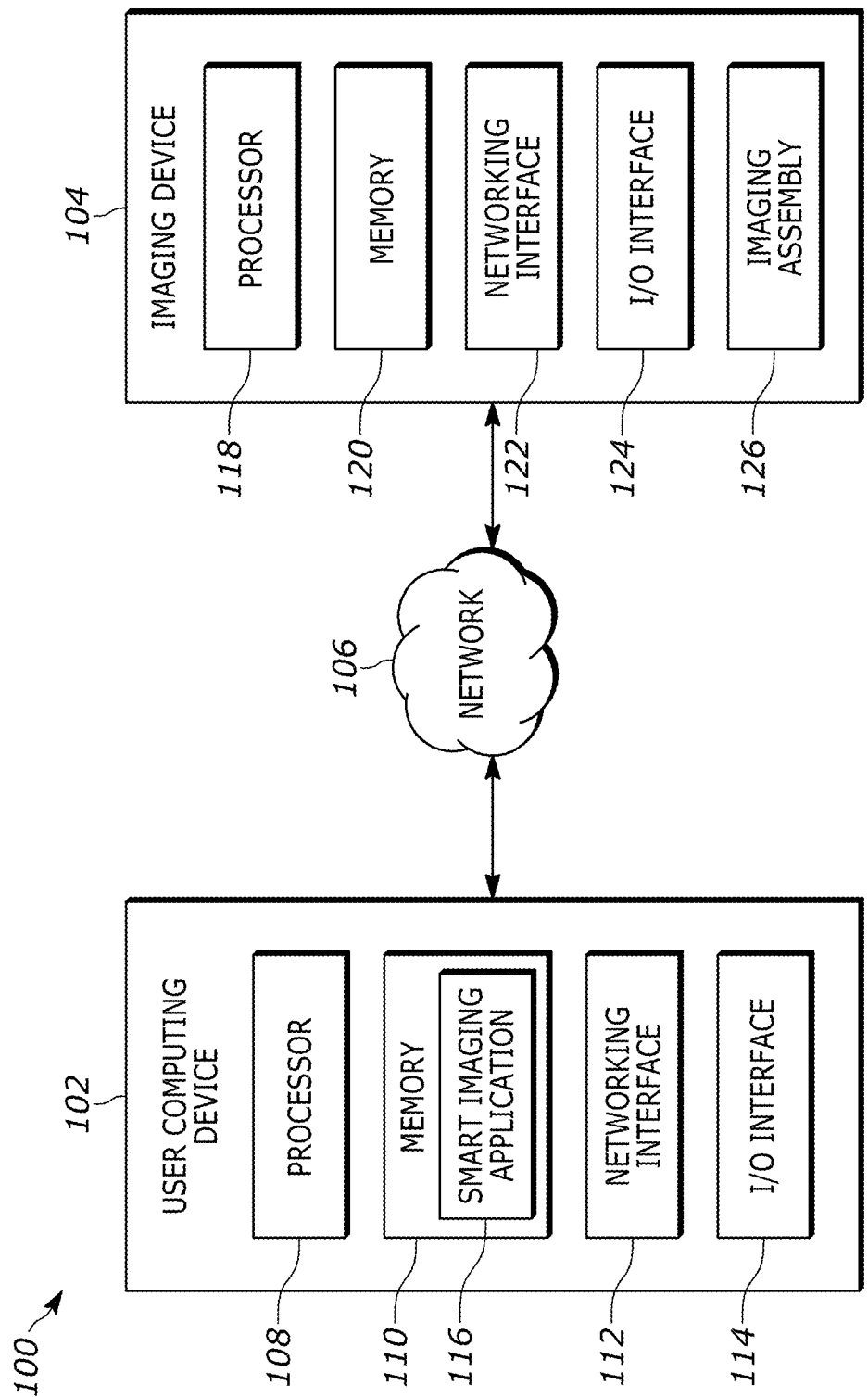
FIG. 1 is an example system for optimizing one or more imaging settings for a machine vision job, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Machine vision system owners/operators have conventionally been plagued with being unable to achieve high fidelity image analysis using multiple imaging settings without purchasing and installing additional system components. Cameras, readers, external lights, and other components can be very costly to purchase and install, and generally reduce system efficiency by requiring users/operators to individually change component settings between image captures to ensure each image is suitable for a particular machine vision technique (e.g., barcode scanning, edge detection, etc.). Thus, it is an objective of the present disclosure to eliminate these and other problems with conventional machine vision systems by enabling the creation and execution of machine vision jobs including a bank of imaging settings that are successively applied by a machine vision camera. As described herein, the embodiments of the present disclosure may reduce the need for costly additional components, speed up the installation and integration time for a machine vision system, and ensure that the system maximizes image capture and processing efficiency.

FIG. 1 illustrates an example smart imaging system 100 configured to analyze pixel data of an image of a target object to optimize one or more imaging settings for a machine vision job, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, and a smart imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
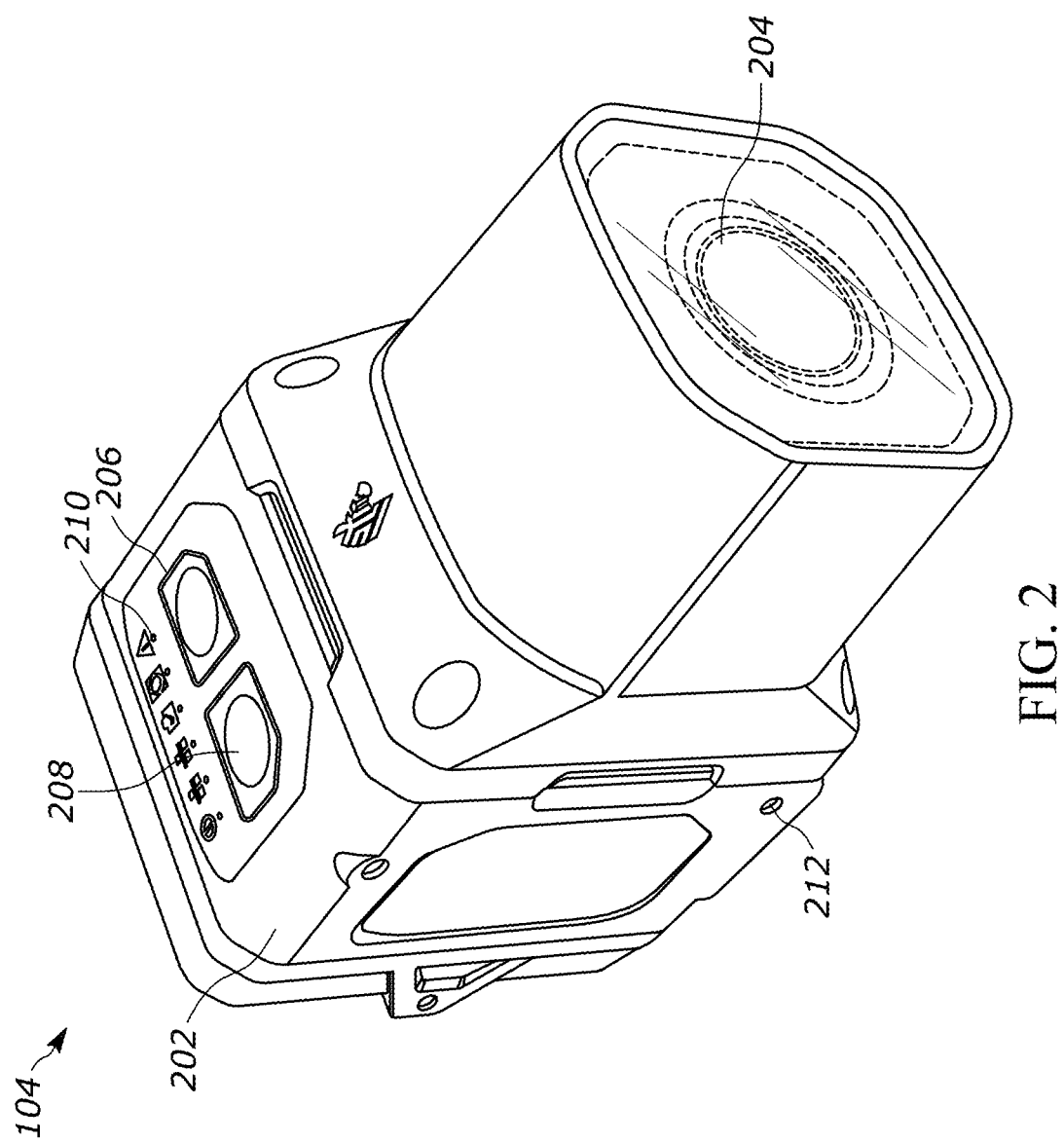
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

FIG. 3 depicts an example application interface 300 utilized to optimize one or more imaging settings for a machine vision job, in accordance with embodiments described herein. Generally, the example application interface 300 may represent an interface of a smart imaging application (e.g., smart imaging application 116) a user may access via a user computing device (e.g., user computing device 102). Specifically, the example application interface 300 may present a user with a list of all available devices (e.g., imaging device 104) to which a user may connect and/or construct machine vision jobs when the user selects the view devices tab 302. From here, the user may view the device selection list 304, which may display each connected device a user may access, and may further include information such as, but without limitation, a device name, a device model number, an IP address corresponding to the device, a device serial number, a device manufacture date, a device firmware status, a device online status, and/or any other suitable indication.

The user may then select a device, indicated by the selected device indicator 306, from the device selection list 304, intending to configure and/or otherwise view some setting of the device. The selected device indicator 306 may display the device name and the device online status, and may additionally or alternatively include any other information related to the device. Upon selection of the device indicated in the selected device indicator 306, the smart imaging application 116 may additionally display a selected device configuration listing 308 within the example application interface 300. The selected device configuration listing 308 may include a variety of information concerning the selected device such as, but without limitation, a selected device general overview (e.g., firmware updates, library updates, etc.), a selected device licenses overview (e.g., DHCP timeout(s), IP address fallback, etc.), a selected device communications overview (e.g., available connection types, current connection type, etc.), a selected device status overview (e.g., lens type, illumination type, etc.), and/or any other suitable information or combinations thereof.

In addition, the selected device configuration listing 308 may include an indication of the machine vision jobs executed, stored, and/or otherwise associated with the selected device. For example, the selected device configuration listing 308 may indicate that the selected device is configured to operate in accordance with a first machine vision job that was uploaded to the selected device at a first time (e.g., "Uploaded at 10:00 AM on 10/10/18"). The selected device configuration listing 308 may additionally indicate that the first machine vision job includes a first configuration of one or more image settings corresponding to the selected device and a second configuration of the one or more image settings corresponding to the selected device. Each of the one or more image settings included in the first and second configuration may additionally be displayed in the selected device configuration listing 308.

The example application interface 300 may additionally include an add device function 310 to allow a user to add additional devices, for example, not found in the device selection list 304. If a user acquires a new device, such as an imaging device (e.g., imaging device 104) the user may click, swipe, and/or otherwise interact with the add device function 310 to add the new device to the device selection list 304. Moreover, once the new device has been added, the user may interact with the setup device functions 312A/B to configure and/or otherwise view the settings corresponding to the new device. Accordingly, the user may interact with the setup device functions 312A/B at any time after a device is added to the device selection list 304 to adjust, view, or otherwise manage the device settings.

Additionally or alternatively, when the user interacts with the setup device functions 312A/B the smart imaging application 116 may generate/render a new interface allowing the user to configure a machine vision job for the selected device (e.g., as indicated by the selected device indicator 306). The user may additionally cause the smart imaging application 116 to generate/render the new interface by interacting with the job creation tab 314. In this manner, the user may transition away from the example application interface 300 to configure a machine vision job corresponding to the selected device through an interaction with either the setup device function 312A/B or the job creation tab 314.

Figure 4A:
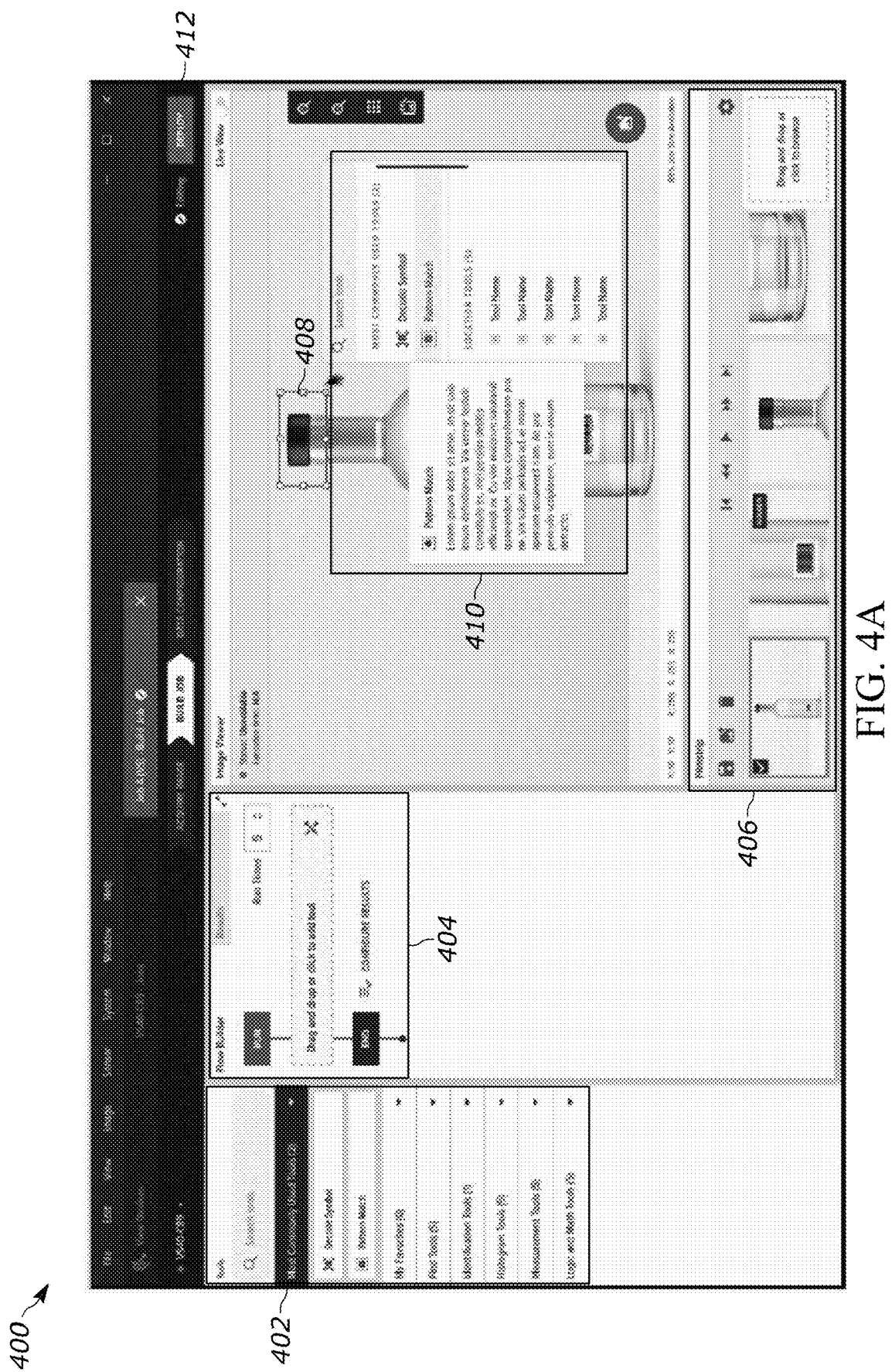
FIG. 4A depicts an additional application interface utilized to optimize one or more imaging settings for a machine vision job, in accordance with embodiments described herein.

FIG. 4A depicts an additional application interfaces utilized to optimize one or more imaging settings for a machine vision job, in accordance with embodiments described herein. For example, after interacting with the job creation tab (e.g., job creation tab 314) and/or the setup device function (e.g., setup device function 312A/B), the smart imaging application (e.g., smart imaging application 116) may transition the user to a job construction application interface 400. Generally, the user may utilize the job construction application interface 400 to organize and configure machine vision tools into a particular sequence that defines a respective machine vision job. The user may additionally utilize the job construction application interface 400 to upload the respective machine vision job to an imaging device (e.g., imaging device 104) for interpretation and execution.

To build a machine vision job, the user may select tools configured to perform machine vision functions. The user may select a tool by clicking, swiping, dragging, and/or otherwise interacting with the available tool(s) list 402. Each tool may be included in drop-down list (as illustrated) of the available tool(s) list 402, or may be plainly visible to the user on the available tool(s) list 402. In any event, the user may select and move a desired tool over to the job flow builder section 404 to begin constructing a machine vision job. In the job flow builder section 404, the user may organize each selected tool into an optimal/preferential order based upon the requirements of the machine vision job. Further, the user may configure each tool to more accurately satisfy the requirements of the machine vision job. For example, the user may configure a barcode scanning tool selected from the available tool(s) list 402 to scan over a larger/smaller area of image(s) captured by the selected device (e.g., imaging device 104).

The user may also select a representative image from the job filmstrip 406 in order to complete configuration of the selected tools. The job filmstrip 406 may include real-time images from the selected device, or they may be stored images (e.g., in the one or more memories 110, 120) that are representative of an ideal image capture for the machine vision job. Additionally or alternatively, the smart imaging application 116 may automatically populate the job filmstrip 406 based on the selected tools in the job flow builder section 404. Once selected, the representative image may appear in a larger section above the job filmstrip 406 that enables the user to place tool ROIs 408 over the representative image. A tool ROI 408 indicates a region of the representative image that the tool represented by the tool ROI 408 may analyze using a machine vision technique. For example, if the tool ROI 408 represents the ROI of a barcode scanning tool, then the barcode scanning tool will scan for a barcode within the region of the representative image indicated by the tool ROI 408.

If the user cannot decide on an appropriate tool for a machine vision job, the user may click, swipe, and/or otherwise interact with the job construction application interface 400 and the smart imaging application 116 may generate/render the tool information region 410. The smart imaging application 116 may provide a user with commonly used tool suggestions, tool type suggestions, descriptions of each tool included in the tool information region 410, and/or any other suitable information of combinations thereof. For example, the smart imaging application 116 may provide a user with an option in the tool information region 410 to search for a particular tool by typing, speaking, and/or otherwise indicating a name, function, or other representative quality of the tool.

When the user has selected and/or ordered one or more tools, and thus created a machine vision job, the job deployment toggle 412 allows a user to upload the machine vision job to the selected device (e.g., imaging device 104). The smart imaging application 116 may register the user interaction with the job deployment toggle 412 and convert the machine vision job to a job file that is then transmitted (e.g., via network 106) to the selected device. The machine vision job may also be stored in memory (e.g., one or more memories 110, 120). The user may additionally toggle the uploaded machine vision job into active/inactive use by interacting with the job deployment toggle 412. Thereafter, the user may adjust configurations/settings associated with the machine vision job by accessing the machine vision job and interacting with the one or more tools in the available tool(s) list 402 and/or the job builder flow section 404, the images in the job filmstrip 406, the tool ROIs 408, and/or by the options within the tool information region 410.

In various embodiments, the job construction application interface 400 allows a user to construct multiple machine vision jobs to be executed in sequence for a selected device (e.g., imaging device 104). For example, the job construction application interface 400 may allow a user to construct a first machine vision job comprising a first set of tools that adjust the configuration of the selected device to a first configuration. The first configuration may include one or more imaging settings of the selected device such as, without limitation, an aperture size, an exposure length, an ISO value, and/or any other suitable value or combinations thereof. The job construction application interface 400 may also allow the user to construct a second machine vision job comprising a second set of tools that adjust the configuration of the selected device to a second configuration. The second set of tools may be the same or different from the first set of tools, and the second configuration may be the same or different from the first configuration. In any event, the smart imaging application 116 may transmit both machine vision jobs to the selected device, and may store both machine vision jobs in memory (e.g., one or more memories 110, 120). Thereafter, the selected device may sequentially perform the first machine vision job and the second machine vision job automatically, e.g., may capture at least one image in accordance with the first configuration, automatically adjust to the second configuration, and capture at least one image in accordance with the second configuration.

Figure 4B:
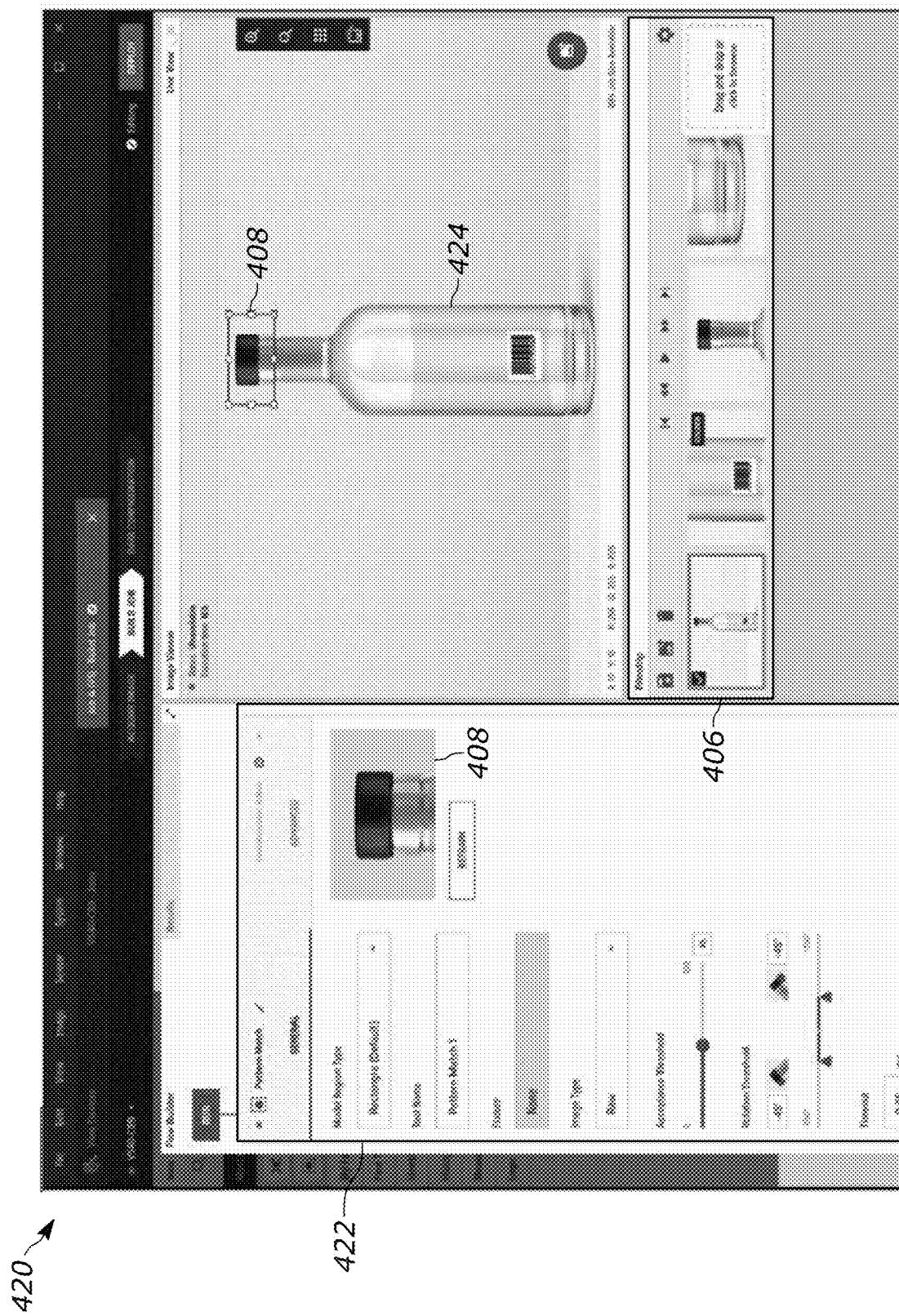
FIG. 4B depicts yet another application interface utilized to optimize one or more imaging settings for a machine vision job, in accordance with embodiments described herein.

However, the user may desire to configure the specific functionality of each tool included in the job builder flow section 404. Thus, in reference to FIG. 4B, the user may interact with a tool in the job builder flow section 404 or other area of the job construction application interface 400, and the smart imaging application 116 may generate/render the tool configuration application interface 420. The tool configuration application interface 420 may enable a user to customize the specific functionality of each tool included in a machine vision job via the user-selectable options present in the tool configuration region 422. For example, the tool configuration region 422 may include tool configuration options such as, without limitation, a tool model region type, a tool name, a tool fixture, a tool image type, a tool acceptance threshold, a tool rotation threshold, a tool timeout, and/or any other suitable tool configuration option. To illustrate, a user may configure the tool rotation threshold corresponding to the tool ROI 408 based upon the relatively minimal rotation of the cap of the target object 424 featured in the image. In this manner, the smart imaging application 116 allows a user to fully customize the selection, order, and individual configuration of each tool included in a machine vision job.

Further, in various embodiments, one or more tools included in the job builder flow section 404 may be artificial intelligence (AI) based tools trained with at least one AI algorithm. For example, training a barcode location tool may involve image analysis of hundreds, thousands, or millions of training images featuring pixel data of objects with barcodes to configure weights of the barcode location tool, and its underlying algorithm (e.g., machine learning or artificial intelligence algorithm) used to predict and/or classify barcode locations in future images. In this example, one or more processors of a computing platform (e.g., user computing device 102) may receive the plurality of training images of the objects with barcodes via a computer network (e.g., network 106). The computing platform may also train the barcode location tool with the pixel data of the plurality of training images.

In various embodiments, an AI tool (e.g., AI barcode location tool), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the artificial intelligence and/or machine learning based algorithms may be included as a library or package executed on a computing platform (e.g., user computing device 102). For example, libraries may include the TENSORFLOW based library, the PYTORCH library, and/or the SCIKIT-LEARN Python library.

Machine learning may involve identifying and recognizing patterns in existing data (such as training a tool based on pixel data of images including one or more target objects with barcodes) in order to facilitate making predictions or identification for subsequent data (such as using the tool on new pixel data of a new target object in order to determine whether the new target object includes a barcode and/or where the barcode is located on the new target object).

Machine learning model(s), such as the AI barcode location tool described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the tool, executing on the server, computing device, or otherwise processor(s), to predict, based on the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of tools until a satisfactory tool, e.g., a tool that provides sufficient prediction accuracy when given test level or production level data or inputs, is generated. The disclosures herein may use one or both of such supervised or unsupervised machine learning techniques.

Generally, pixel data comprises points or squares of data within an image, where each point or square represents a single pixel within an image. Each pixel may be a specific location within an image. In addition, each pixel may have a specific color (or lack thereof). Pixel color may be determined by a color format and related channel data associated with a given pixel. For example, a popular color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) is used to generate 24 bit color. Each 8-bit RGB component can have 256 possible values, ranging from 0 to 255 (i.e., in the base 2 binary system, an 8 bit byte can contain one of 256 numeric values ranging from 0 to 255). This channel data (R, G, and B) can be assigned a value from 0 255 and be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values. So (Red=220, Green=220, Blue=220) is a light gray (near white), and (Red=40, Green=40, Blue=40) is a dark gray (near black).

In this way, the composite of three RGB values creates the final color for a given pixel. With a 24-bit RGB color image using 3 bytes there can be 256 shades of red, and 256 shades of green, and 256 shades of blue. This provides 256×256× 256, i.e., 16.7 million possible combinations or colors for 24 bit RGB color images. In this way, the pixel's RGB data value shows how much of each of Red, and Green, and Blue the pixel is comprised of. The three colors and intensity levels are combined at that image pixel, i.e., at that pixel location on a display screen, to illuminate a display screen at that location with that color. It is to be understood, however, that other bit sizes, having fewer or more bits, e.g., 10-bits, may be used to result in fewer or more overall colors and ranges.

As a whole, the various pixels, positioned together in a grid pattern, form a digital image (e.g., pixel data 202$ap$, 202$bp$, and/or 202$cp$). A single digital image can comprise thousands or millions of pixels. Images can be captured, generated, stored, and/or transmitted in a number of formats, such as JPEG, TIFF, PNG and GIF. These formats use pixels to store represent the image.

Image analysis may include training a machine learning based tool (e.g., an AI barcode location tool) on pixel data of images including one or more target objects with barcodes. Additionally, or alternatively, image analysis may include using a machine learning based tool, as previously trained, to determine, based on the pixel data (e.g., including their RGB values) of one or more images including one or more target objects, whether each of the one or more target objects includes a barcode and/or where the barcode is located on each of the one or more target objects. The weights of the tool may be trained via analysis of various RGB values of barcode pixels of a given image. For example, dark or low RGB values (e.g., a pixel with values R=25, G=28, B=31) may indicate the typically black colored region of a barcode. A lighter RGB value (e.g., a pixel with R=210, G=234, and B=241) may indicate the typically white region of a barcode (e.g., spaces between the black barcode bars or black square of a QR code).

Together, when a series of pixels in an analyzed region transition from dark or low RGB values to lighter RGB values (or vice versa) in a consistent succession, that may indicate the presence of a barcode represented by the series of pixels. For example, an image may feature a front surface of a target object, wherein the front surface includes a barcode near the bottom of the image. The AI barcode location tool may analyze one or more regions of the image until the AI barcode location tool analyzes a respective region including pixels representative of the target object's barcode. The AI barcode location tool may recognize that the pixels are indicative of the barcode because the pixels may have a succession of very dark RGB value pixels contrasted with very light RGB value pixels. In this way, pixel data (e.g., detailing one or more features of a target object, such as a respective target object's barcode) of thousands or millions of training images may be used to train or use a machine learning tool (e.g., AI barcode location tool) to determine a presence/location of a barcode and/or any other suitable machine vision technique described herein.

Figure 5:
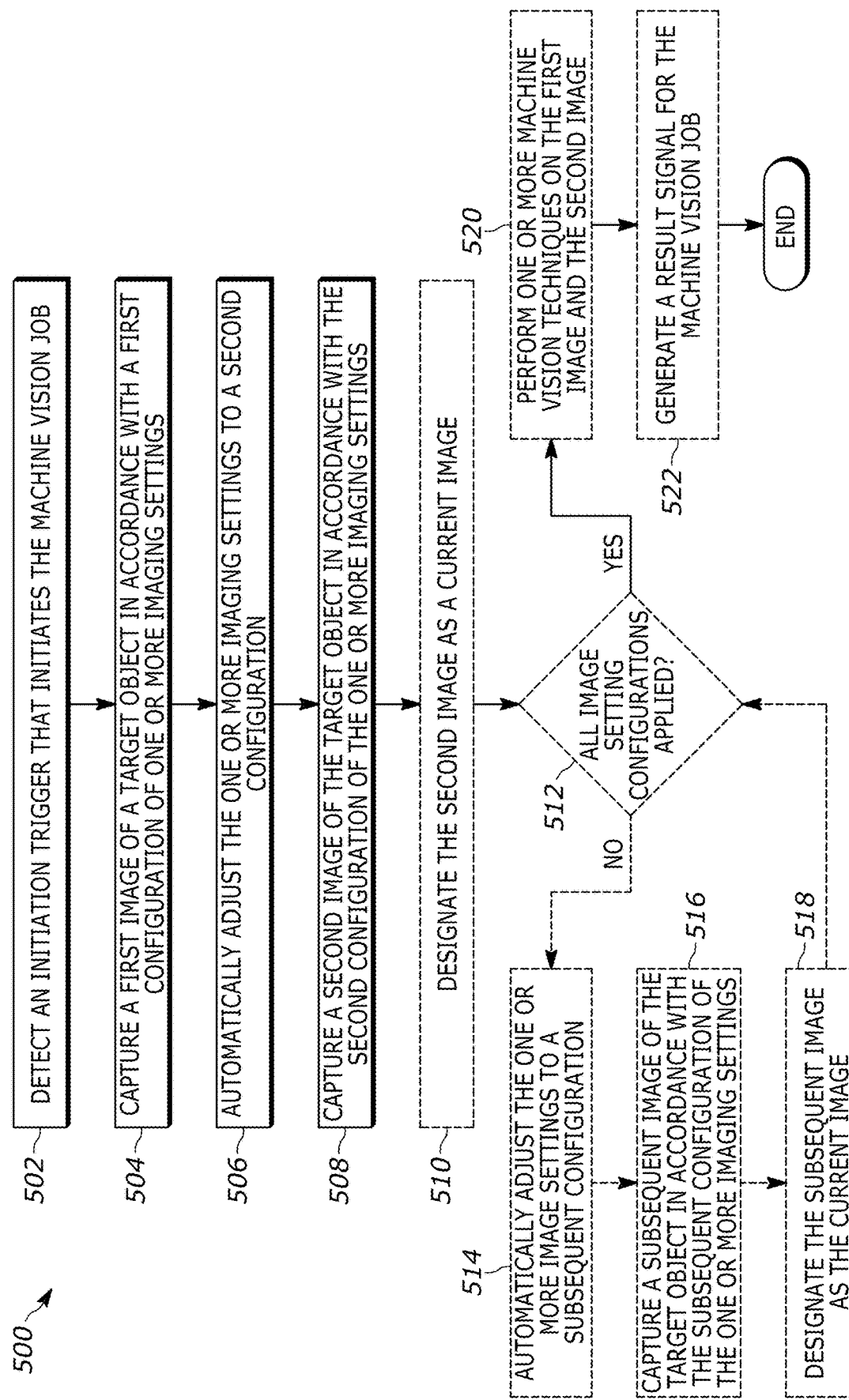
FIG. 5 is a flowchart representative of a method for optimizing one or more imaging settings for a machine vision job, in accordance with embodiments described herein.

FIG. 5 is a flowchart representative of a method 500 for optimizing one or more imaging settings for a machine vision job, in accordance with embodiments described herein. Method 500 describes various methods for optimizing one or more imaging settings for a machine vision job, and embodiments of the method 500 are discussed below in context with FIG. 6. Generally speaking, the method 500 for optimizing one or more imaging settings for a machine vision job includes detecting an initiation trigger to capture a first image, capturing a first image of a target object in accordance with a first configuration of one or more imaging settings, automatically adjusting the one or more imaging settings to a second configuration, and capturing a second image of the target object in accordance with the second configuration of the one or more imaging settings. Capturing the first image, automatically adjusting the imaging settings, and capturing the second image may each be discussed with additional reference to FIG. 6.

Figure 6:
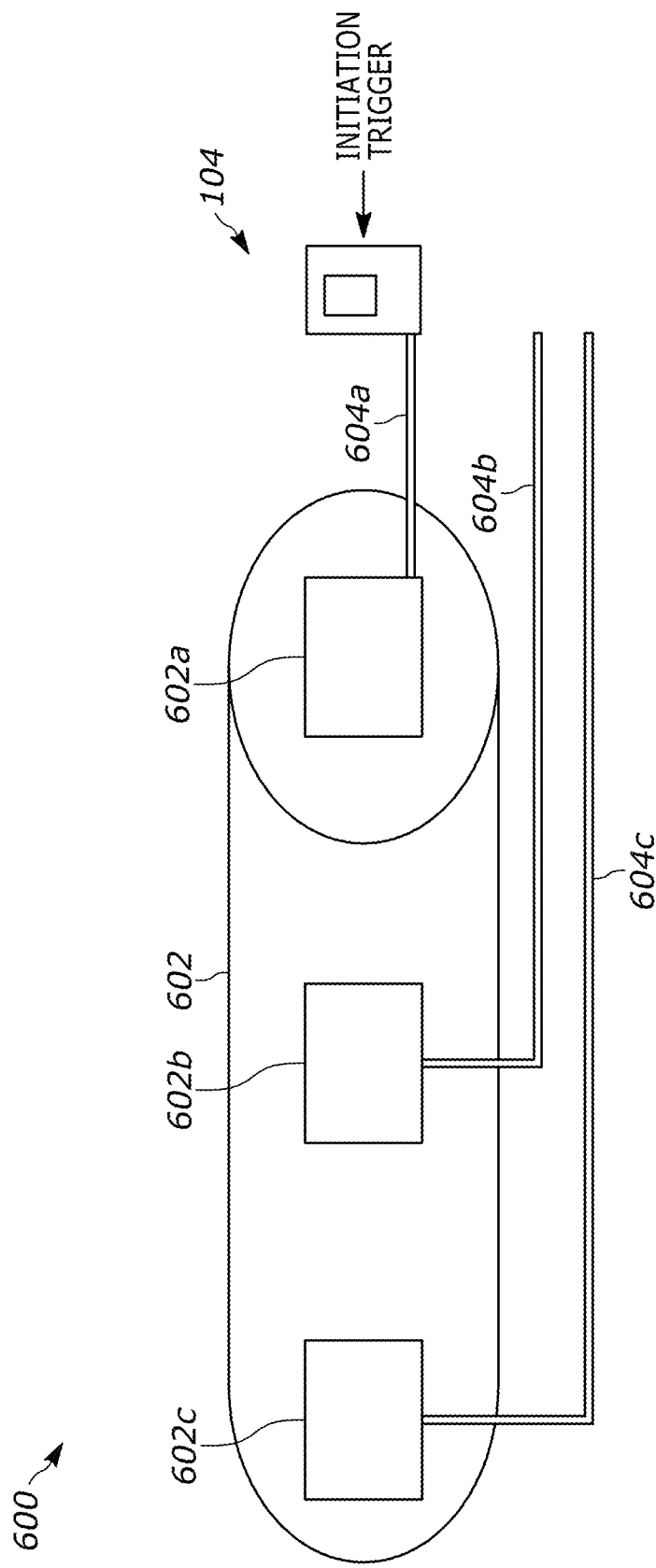
FIG. 6 depicts the execution of an example machine vision job that includes multiple imaging settings, where the example machine vision job implements example methods and/or operations described herein.

It is to be understood that, when described in reference to FIGS. 5 and 6, the imaging device 104 and/or the imaging assembly 126 may comprise a single camera configured to perform the various actions and functionalities described herein. However, in various embodiments, the imaging device 104 may include multiple cameras.

In addition, for simplicity, each imaging settings configuration discussed in reference to FIGS. 5 and 6 is described in terms of one or more sets of machine vision tools. For example, a first image may be captured in accordance with a first configuration and a second image may be captured in accordance with a second configuration based on one or more machine vision tools used to analyze the first and second images, respectively. It is to be appreciated that each imaging settings configuration (e.g., the first configuration, the second configuration, etc.) may also be determined based on a distance from the imaging device 104 to the target object and/or any other suitable metric. For example, the first image may be captured in accordance with a first configuration and a second image may be captured in accordance with a second configuration determined based upon a first distance from the imaging device 104 to the target object and a second distance from the imaging device 104 to the target object, respectively. In this example and others utilizing different metrics and/or more or fewer imaging settings configurations, each machine vision tool included in the machine vision job may analyze each image capture.

The method 500 may include detecting an initiation trigger that initiates a machine vision job (block 502). Broadly, the initiation trigger may describe a catalyst causing the imaging device 104 to capture an image of a target object in accordance with a set of imaging settings. For example, the initiation trigger may be any action, threshold satisfaction, timing sequence completion, and/or other incidence causing the imaging device 104 to capture an image of a target object. In various embodiments, the initiation trigger may comprise the target object entering a field of view (FOV) of the imaging device 104. In such embodiments, the imaging device 104 may include a proximity sensor or other suitable device configured to recognize the presence of a target object at a location, generate the initiation trigger in response to recognizing the presence of the target object, and transmit the initiation trigger to the imaging device 104 to cause the imaging device 104 to capture an image of the target object. Block 502 may be performed by, for example, the imaging device 104 and/or the user computing device 102.

Moreover, the machine vision job may generally include at least one machine vision tool configured to perform at least one machine vision technique on a captured image. To illustrate, the machine vision tools may include, without limitation, (i) a barcode scanning tool, (ii) a pattern matching tool, (iii) an edge detection tool, (iv) a semantic segmentation tool, (v) an object detection tool, and/or (vi) an object tracking tool. As an example, the machine vision job may comprise a barcode scanning tool configured to perform a barcode scanning technique on an image captured by the imaging device 104. In various embodiments, the machine vision job may include one or more machine vision tools configured to perform one or more machine vision techniques on the first image and the second image, as discussed herein. Moreover, it should be understood that each machine vision tool referenced and/or otherwise included herein may include multiple reference names/designations, and all such machine vision tools are contemplated for use within the embodiments of the present disclosure.

The method 500 may further include capturing a first image of a target object in accordance with a first configuration of one or more imaging settings (block 504). The imaging device 104 may capture the first image of the target object in response to detecting/receiving the initiation trigger. Generally, the first configuration of the one or more imaging settings may correspond to optimal imaging settings for the first machine vision tool or the first set of machine vision tools to be executed as part of the machine vision job. For example, assume that the first machine vision tool included in the machine vision job is a barcode scanning tool, and further assume that the barcode scanning tool may optimally perform a barcode scanning technique on an image captured with high contrast. The first configuration of the one or more imaging settings may include a high contrast setting and/or a combination of imaging settings configured to produce a high contrast image. Block 504 may be performed by, for example, the imaging device 104.

As another example, assume that the first set of machine vision tools included in the machine vision job is a barcode scanning tool, an edge detection tool, and a pattern matching tool. Further, assume that the barcode scanning tool may optimally perform a barcode scanning technique on an image captured with high contrast, the edge detection tool may optimally perform an edge detection technique on an image captured with medium contrast, and the pattern matching tool may optimally perform a pattern matching technique on an image captured with high gain. The first configuration of the one or more imaging settings may include a medium contrast setting, a high contrast setting, a high gain setting, and/or a combination of imaging settings configured to produce a combination of the optimal settings for each machine vision tool (e.g., one or more "average" optimal imaging settings). To illustrate, each of the barcode scanning tool, the edge detection tool, and the pattern matching tool may have one or more different optimal image settings. However, when the imaging device 104 captures the first image with the one or more "average" optimal imaging settings, each tool may be able to quickly and efficiently perform its respective machine vision technique on the first image. In this manner, multiple machine vision tools may perform their respective machine vision techniques on a single image captured using imaging settings based upon the optimal imaging settings of one, some, or all of the multiple machine vision tools.

In various embodiments, the one or more imaging settings may include one or more of (i) an aperture size, (ii) an exposure length, (iii) an ISO value, (iv) a focus value, (v) a gain value, and/or (vi) an illumination control.

It is to be understood that the imaging device 104 or other suitable imaging system may automatically reconfigure the one or more imaging settings to be in accordance with the first configuration as a real-time response to detecting/receiving the initiation trigger and prior to capturing the first image. For example, and in reference to FIG. 6, the imaging device 104 may detect/receive the initiation trigger to capture the first image of a target object 602. The target object 602 may include three target areas 602a, 602b, and 602c, each including a feature of interest (e.g., a barcode, a pattern, an edge, etc.). The imaging device 104 may also include a machine vision job in memory configured to execute upon detection/receipt of the initiation trigger, and/or the imaging device 104 may download (e.g., via network 106) from a remote storage device (e.g., user computing device 102) a machine vision job configured to execute upon detection/receipt of the initiation trigger. The machine vision job may include one or more machine vision tools, and each tool may include a unique set of imaging settings corresponding to the respective tool. For example, and as previously mentioned, a barcode scanning tool may require high contrast images, and may accordingly include a high contrast imaging setting when included in a machine vision job.

In any event, the imaging device 104 may detect/receive the initiation trigger causing the imaging device 104 to capture the first image. Assume that the first image corresponds to the first target area 602a of the target object 602, and that the first target area 602a includes a respective pattern. Further, assume that the machine vision job includes a pattern matching tool configured to identify and analyze the respective pattern in the first target area 602a, and that the instructions included in the job file corresponding to the pattern matching tool include a unique set of imaging settings intended to optimize image captures for pattern matching analysis (In this example, the "first configuration"). Moreover, assume that the job file includes instructions indicating a first distance 604a from the imaging device 104 to the first target area 602a. Prior to capturing the first image, the imaging device 104 may interpret and/or otherwise receive the instructions included in the job file corresponding to the pattern matching tool and the first distance 604a, and as a result, the imaging device 104 may adjust one or more imaging settings to match the first configuration identified in the job file instructions. Thereafter, the imaging device 104 may capture the first image in accordance with the first configuration.

Additionally or alternatively, the imaging device 104 may include a ranging device and/or other distance measuring equipment to determine the first distance 604a, the second distance 604b, the third distance 604c, and/or any other suitable distance prior to capturing the first image. For example, assume that the job file in the previous example does not include instructions indicating the first distance 604a. Further, assume that the first configuration specifies that the imaging device 104 should capture the first image using a medium gain setting, but does not specify other imaging settings (e.g., an aperture size, a focus value, etc.) to achieve a suitable image of the first target area 602a using a medium gain setting at the first distance 604a. In this example, the ranging device may determine the first distance 604a and transmit the first distance to the one or more processors 118 of the imaging device 104. The one or more processors 118 may analyze the first distance in accordance with known imaging relationships (e.g., increasing aperture size results in a shallower depth of field) to determine specific imaging settings to capture the first image (and/or any subsequent image) in accordance with the first configuration (e.g., a medium gain setting). Thus, the imaging device 104 may adjust, for example, the gain setting, the aperture size, the focus value, and/or any other suitable imaging setting to achieve a set of imaging settings in accordance with the first configuration. It will be appreciated that the imaging device 104 may also automatically determine suitable imaging settings to achieve a set of imaging settings in accordance with the first configuration, the second configuration, the third configuration, and/or any other configurations in the absence of a ranging device and/or other distance measuring equipment.

The method 500 may further include automatically adjusting the one or more imaging settings to a second configuration that includes at least one different imaging setting from the first configuration (Block 506). Generally, the second configuration may correspond to one or more machine vision tools that were not included in the first configuration. For example, the first machine vision tool included in the machine vision job may include a barcode scanning tool, which may require high contrast and medium/low brightness images for optimal barcode scanning analysis. Accordingly, the first configuration may include a high contrast setting and a medium/low brightness setting causing the imaging device 104 to capture the first image of the first target area 604a at a high contrast and medium/low brightness. However, the second machine vision tool included in the machine vision job may include an edge detection tool, which may require medium contrast and medium/high brightness images for optimal edge detection analysis. Accordingly, the second configuration may include a medium contrast setting and a medium/high brightness setting causing the imaging device 104 to adjust the contrast and the brightness settings prior to capturing the second image. Of course, the imaging settings included in the first configuration and the second configuration may include any suitable imaging settings. Block 506 may be performed by, for example, the imaging device 104.

In various embodiments, the imaging device may be configured to automatically adjust the imaging settings for the imaging assembly (e.g., imaging assembly 126) and any additional components included as part of the imaging device. For example, the imaging device may obtain a first configuration as part of the job file that includes a small aperture size and a medium illumination setting. The imaging device may automatically adjust the aperture size of the imaging device to a small setting, and may additionally automatically adjust the illumination setting of an external and/or internal illumination device to a medium setting. Of course, in these embodiments, the imaging device may be configured to adjust the imaging settings associated with any number and/or type of additional components that are internally/externally included as part of the imaging device.

The method 500 may further include capturing a second image of the target object in accordance with the second configuration of the one or more imaging settings (block 508). For example, assume a first set of one or more machine vision tools included, as part of the job file, a first configuration causing the imaging device 104 to capture the first image of the target object (e.g., target object 602) in accordance with the first configuration. The imaging device (e.g., imaging device 104) may obtain the first configuration and adjust the imaging settings of the imaging device accordingly. Further assume that a second set of one or more machine vision tools included, as part of the job file, a second configuration with at least one imaging setting that is different from the first configuration. The imaging device may capture the first image and thereafter automatically adjust the imaging settings of the imaging device in accordance with the second configuration prior to capturing the second image. The imaging device may then capture the second image in accordance with the imaging settings corresponding to the second configuration. Block 508 may be performed by, for example, the imaging device 104.

To illustrate, and in reference to FIG. 6, assume that the imaging device 104 receives a job file including a first and second set of machine vision tools and corresponding first and second configurations configured to capture an image of the first and second target areas 602a, 602b, respectively. Further, assume that the first configuration includes a small aperture size setting and a medium brightness setting, and the second configuration includes a medium aperture size setting and a high brightness setting. In this example, the imaging device may obtain the initiation trigger and automatically adjust the imaging settings of the imaging device to a small aperture size and a medium brightness to capture the first image of the first target area 602a. Of course, it is to be appreciated that the imaging device may alternatively automatically adjust the imaging settings of the imaging device in accordance with the first configuration prior to obtaining the initiation trigger. In any event, responsive to the first image capture, the imaging device may automatically adjust the imaging settings of the imaging device to a medium aperture size and a high brightness setting. Accordingly, the imaging device may capture the second image of the second target area 602b using a medium aperture size and a high brightness setting. In this manner, the imaging device 104 may capture a first image of the first target area 602a in accordance with a first configuration of imaging settings, and the device 104 may capture a second image of the second target area 602b in accordance with a second configuration of imaging settings in response to a single initiation trigger.

The method 500 may further include designating the second image as a current image (optional block 510) and determining whether all image setting configurations have been applied (optional block 512). Namely, the job file including the first set of machine vision tools and the second set of machine vision tools may include any suitable number of sets of machine vision tools and/or individual machine vision tools requiring a specific configuration of imaging settings. Accordingly, the imaging device may, in response to the initiation trigger, designate each recently captured image as a current image and determine whether or not all imaging setting configurations have been applied such that all corresponding images have been captured. If the imaging device determines that all imaging setting configurations have not been applied (NO branch of optional block 512), then the imaging device may proceed to perform the action(s) included in optional block 514. Alternatively, if the imaging device determines that all imaging setting configurations have been applied (YES branch of optional block 512), then the imaging device may proceed to perform the action(s) included in optional block 520. Optional blocks 510 and 512 may be performed by, for example, the imaging device 104.

For example, and in reference to FIG. 6, assume that a job file transmitted to the imaging device (e.g., imaging device 104) includes three distinct sets of machine vision tools, each set including a respective imaging setting configuration. In response to detecting, receiving, and/or otherwise perceiving the initiation trigger, the imaging device may automatically adjust the imaging settings in accordance with the first respective configuration and capture the first image of the first target area 602a and thereafter automatically adjust the imaging settings in accordance with the second respective configuration and capture the second image of the second target area 602b. The imaging device may then designate the second image as the current image and determine that a third respective imaging setting configuration has yet to be applied. Accordingly, the imaging device may determine that all imaging setting configurations have not been applied (NO branch of optional block 512) and continue to optional block 514.

Moreover, in various embodiments, the machine vision job may include (e.g., as part of the job file) a predetermined number of configurations of the one or more imaging settings. As previously mentioned, the machine vision job may include one or more machine vision tools, each including a corresponding configuration of the one or more imaging settings. Additionally or alternatively, the machine vision job may include sets of machine vision tools, wherein each set may include a combined/aggregate configuration and/or a plurality of configurations of the one or more imaging settings, as discussed herein. Further in these embodiments, each configuration of the one or more imaging settings included in the machine vision job may include the same machine vision tools; however, the machine vision tool settings (e.g., the user-selectable options present in the tool configuration region 422) may each be tailored for the specific configuration. As an example, if a machine vision job includes three configurations of the one or more imaging settings to capture a first, second, and a third image of the first, second, and third target areas 602a-c, respectively, then the settings for each machine vision tool included in each of the first, second, and third configurations may be adjusted to maximize their individual processing potential (e.g., potential for a barcode scanning tool to scan a barcode, potential for a pattern matching tool to match a pattern, etc.) for each configuration.

The method 500 may further include automatically adjusting the one or more image settings to a subsequent configuration (optional block 514). Generally speaking, each subsequent configuration may include at least one imaging setting that is different from each prior configuration of the one or more imaging settings. For example, assume that a respective configuration of the one or more imaging settings includes a high contrast setting, a small aperture size setting, and a short exposure time setting. In this example, every other respective configuration may include at most two of the high contrast setting, the small aperture size setting, and the short exposure time setting included in the respective configuration. In reference to the prior example, the imaging device may automatically adjust the imaging settings of the imaging device from the second respective imaging setting configuration to the third respective imaging setting configuration. Optional block 514 may be performed by, for example, the imaging device 104.

The method 500 may further include capturing a subsequent image of the target object in accordance with the subsequent configuration of the one or more imaging settings (optional block 516). Continuing the prior example, the imaging device may capture a third image of the third target area 602c in accordance with the third respective imaging setting configuration. The method 500 may further include designating the subsequent image as the current image (optional block 518), and returning to optional block 512. In the prior example, the imaging device may designate the third image as the current image, and again determine whether or not all imaging setting configurations have been applied. As an example, if the machine vision job includes (e.g., via the job file) a fourth respective imaging setting configuration, then the imaging device may automatically adjust the one or more imaging settings in accordance with the fourth respective imaging setting configuration and capture a fourth image. In certain embodiments, the imaging device may iteratively perform each of the actions associated with optional blocks 512 through optional block 518 until the imaging device determines that all imaging setting configurations have been applied (YES branch of optional block 512). Optional blocks 516 and 518 may be performed by, for example, the imaging device 104.

When the imaging device determines that all imaging setting configurations have been applied (YES branch of optional block 512), the imaging device may perform one or more machine vision techniques on the captured images (optional block 520). As previously discussed, the machine vision job may include one or more machine vision tools, each configured to perform one or more machine vision techniques on the captured images. For example, the machine vision job may include a barcode scanning tool, a pattern matching tool, an edge detection tool, and/or any other suitable machine vision tool or combinations thereof. Thus, the imaging device may (as part of the machine vision job) apply the barcode scanning tool to the first image to scan the first image for a barcode. Similarly, the imaging device may apply the pattern matching tool and the edge detection tool to the first image to identify one or more patterns and one or more edges, respectively. The imaging device may additionally apply these and/or other machine vision tools to each of the captured images (e.g., the second, third, fourth, and/or all subsequent images). Optional block 520 may be performed by, for example, the imaging device 104.

In various embodiments when one or more of the machine vision tools is an AI machine vision tool, each of the captured images may be collected or aggregated at the imaging device and may be analyzed by, and/or used to train, the AI machine vision tool (e.g., an AI tool such as a machine learning imaging tool as described herein). Each of these images may comprise pixel data (e.g., RGB data) representing feature data of the target object and corresponding to each of the imaging setting configurations included in the machine vision job.

The method 500 may further include generating a result signal for the machine vision job (optional block 522). Generally, the machine vision job may return a result signal to indicate to a user/operator whether or not the captured images satisfy the thresholds and/or otherwise result in a satisfactory analysis from each of the machine vision tools included in the machine vision job. If a single machine vision tool does not return and/or otherwise perform a satisfactory analysis when analyzing a respective captured image, the machine vision job may fail for the respective captured image. By contrast, if all machine vision tools included in a machine vision job for a particular configuration of the one or more imaging settings return and/or otherwise perform a satisfactory analysis on a respective captured image, the machine vision job may pass for the respective captured image. As a result, the imaging device may return a result signal to the user/operator to represent a pass indication or a fail indication for the machine vision job. Optional block 522 may be performed by, for example, the imaging device 104.

For example, and in reference to FIG. 6, assume that the imaging device 104 captures a first image of the first target area 602a of the target object 602. Assume that the machine vision tools analyzing the first image are configured to search for a first barcode, a first pattern, a first edge, and a first set of alphanumeric characters. Further, assume that each machine vision tool performs a satisfactory analysis, such that the machine vision tools analyzing the first image successfully identify each of the first barcode, the first pattern, the first edge, and the first set of alphanumeric characters. As a result, the imaging device may output a pass indication for display to a user/operator, indicating that each machine vision tool successfully performed a satisfactory analysis.

As another example, assume that the imaging device 104 captures a second image of the second target area 602b of the target object 602. Assume that the machine vision tools analyzing the second image are configured to search for a second barcode, a second pattern, a second edge, and a second set of alphanumeric characters. Further, assume that some of the machine vision tools perform a satisfactory analysis, such that the machine vision tools analyzing the second image successfully identify each of the second barcode, the second pattern, and the second edge. However, assume that at least one machine vision tool does not perform a satisfactory analysis, such that the at least one machine vision tool does not successfully identify the second set of alphanumeric characters. As a result, the imaging device may output a fail indication for display to a user/operator, indicating that the at least one machine vision tool failed to successfully perform a satisfactory analysis with respect to the second image.

In the above examples, the pass/fail indications may include any suitable information, and be presented in any suitable format. Generally, the pass/fail indications may include any alphanumeric characters, symbols, icons, colors, highlighting, pictures and/or other graphical representations, and/or any other suitable indications or combinations thereof. For example, the fail indication of the prior example may include text indicating that the at least one machine vision tool failed to identify the second set of alphanumeric characters. As another example, the pass indication of the prior example may include a green light or other symbol (e.g., a graphical hand in a "thumbs up" configuration) indicative of the machine vision tools positively identifying each of the first barcode, the first pattern, the first edge, and the first set of alphanumeric characters. Additionally, or alternatively, the pass/fail indications for each respective captured image and/or portions thereof may be used and/or overlaid on a graphical representation of the respective captured image.

Additionally, it is to be understood that each of the actions described in the method 500 may be performed in any order, number of times, or any other combination(s) therein suitable to optimize one or more imaging settings for a machine vision job. For example, some or all of the blocks of the method 500 may be fully performed once, multiple times, or not at all.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for optimizing one or more imaging settings for a machine vision job, the method comprising:

detecting, by one or more processors, an initiation trigger that initiates the machine vision job;

responsive to detecting the initiation trigger, capturing, by an imaging device, a first image of a target object in accordance with a first configuration of the one or more imaging settings;

responsive to capturing the first image of the target object, automatically adjusting, by the one or more processors, the one or more imaging settings to a second configuration that includes at least one different imaging setting from the first configuration;

capturing, by the imaging device, a second image of the target object in accordance with the second configuration of the one or more imaging settings;

(a) designating the second image as a current image;

(b) responsive to capturing the current image of the target object, automatically adjusting the one or more imaging settings to a subsequent configuration that includes at least one different imaging setting from each prior configuration of the one or more imaging settings; and (c) capturing, by the imaging device, a subsequent image of the target object in accordance with the subsequent configuration of the one or more imaging settings.

2. The method of claim 1, wherein the one or more imaging settings include one or more of (i) an aperture size, (ii) an exposure length, (iii) an ISO value, (iv) a focus value, (v) a gain value, or (vi) an illumination control.

3. The method of claim 1, wherein the initiation trigger comprises the target object entering a field of view (FOV) of the imaging device.

4. The method of claim 1, wherein the imaging device includes a single camera.

5. The method of claim 1, wherein the machine vision job includes a predetermined number of configurations of the one or more imaging settings.

6. The method of claim 5, further comprising:

(d) designating the subsequent image as the current image; and (e) iteratively performing steps (b)-(e) until each configuration of the predetermined number of configurations of the one or more imaging settings has been utilized to capture at least one image of the target object.

7. A computer system for optimizing one or more imaging settings for a machine vision job, the system comprising:

an imaging device configured to:
capture a first image of a target object in accordance with a first configuration of the one or more imaging settings, and
capture a second image of the target object in accordance with a second configuration of the one or more imaging settings;

one or more processors; and a non-transitory computer-readable memory coupled to the imaging device and the one or more processors, the memory storing instructions thereon that, when executed by the one or more processors, cause the one or more processors to:

detect an initiation trigger that initiates the machine vision job;

responsive to capturing the first image of the target object, automatically adjusting the one or more imaging settings to the second configuration that includes at least one different imaging setting from the first configuration;

(a) designate the second image as a current image;

(b) responsive to capturing the current image of the target object, automatically adjust the one or more imaging settings to a subsequent configuration that includes at least one different imaging setting from each prior configuration of the one or more imaging settings; and (c) capture, by the imaging device, a subsequent image of the target object in accordance with the subsequent configuration of the one or more imaging settings.

8. The computer system of claim 7, wherein the one or more imaging settings include one or more of (i) an aperture size, (ii) an exposure length, (iii) an ISO value, (iv) a focus value, (v) a gain value, or (vi) an illumination control.

9. The computer system of claim 7, wherein the initiation trigger comprises the target object entering a field of view (FOV) of the imaging device.

10. The computer system of claim 7, wherein the machine vision job includes a predetermined number of configurations of the one or more imaging settings.

11. The computer system of claim 10, wherein the instructions, when executed by the one or more processors, further cause the one or more processors to:

(d) designate the subsequent image as the current image; and (e) iteratively perform steps (b)-(e) until each configuration of the predetermined number of configurations of the one or more imaging settings has been utilized to capture at least one image of the target object.

12. A tangible machine-readable medium comprising instructions for optimizing one or more imaging settings for a machine vision job that, when executed, cause a machine to at least:

detect an initiation trigger that initiates the machine vision job;

responsive to detecting the initiation trigger, capture, by an imaging device, a first image of a target object in accordance with a first configuration of the one or more imaging settings;

responsive to capturing the first image of the target object, automatically adjust the one or more imaging settings to a second configuration that includes at least one different imaging setting from the first configuration;

capture, by the imaging device, a second image of the target object in accordance with the second configuration of the one or more imaging settings;

(a) designate the second image as a current image;

(b) responsive to capturing the current image of the target object, automatically adjust the one or more imaging settings to a subsequent configuration that includes at least one different imaging setting from each prior configuration of the one or more imaging settings; and (c) capture, by the imaging device, a subsequent image of the target object in accordance with the subsequent configuration of the one or more imaging settings.

13. The tangible machine-readable medium of claim 12, wherein the machine vision job includes a predetermined number of configurations of the one or more imaging settings, and wherein the instructions, when executed, further cause the machine to at least:

(d) designate the subsequent image as the current image; and (e) iteratively perform steps (b)-(e) until each configuration of the predetermined number of configurations of the one or more imaging settings has been utilized to capture at least one image of the target object.

14. The method of claim 1, wherein the machine vision job includes one or more machine vision tools configured to perform one or more machine vision techniques on the first image and the second image.

15. The method of claim 14, further comprising:
performing, by the one or more processors, the one or more machine vision techniques on the first image and the second image in accordance with the one or more machine vision tools included in the machine vision job; and
generating, by the one or more processors, a result signal representing a pass indication or a fail indication for the machine vision job.

16. The method of claim 14, wherein the one or more machine vision tools include at least one of (i) a barcode scanning tool, (ii) a pattern matching tool, (iii) an edge detection tool, (iv) a semantic segmentation tool, (v) an object detection tool, or (vi) an object tracking tool.

17. The computer system of claim 7, wherein the machine vision job includes one or more machine vision tools configured to perform one or more machine vision techniques on the first image and the second image.

18. The computer system of claim 17, wherein the instructions, when executed by the one or more processors, further cause the one or more processors to:
perform the one or more machine vision techniques on the first image and the second image in accordance with the one or more machine vision tools included in the machine vision job; and
generate a result signal representing a pass indication or a fail indication for the machine vision job.

19. The tangible machine-readable medium of claim 12, wherein the machine vision job includes one or more machine vision tools configured to perform one or more machine vision techniques on the first image and the second image.

20. The tangible machine-readable medium of claim 19, wherein the instructions, when executed, further cause the machine to at least:
perform the one or more machine vision techniques on the first image and the second image in accordance with the one or more machine vision tools included in the machine vision job; and
generate a result signal representing a pass indication or a fail indication for the machine vision job.

* * * * *